(12) United States Patent
Evans et al.

(10) Patent No.: US 8,175,645 B2
(45) Date of Patent: May 8, 2012

(54) SYSTEM AND METHOD FOR MODIFYING A DEVICE PROFILE

(75) Inventors: James Evans, Apex, NC (US); Richard J. Walsh, Raleigh, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 914 days.

(21) Appl. No.: 11/451,225

(22) Filed: Jun. 12, 2006

(65) Prior Publication Data

US 2007/0288543 A1 Dec. 13, 2007

(51) Int. Cl.
*H04M 1/00* (2006.01)
(52) U.S. Cl. ............... 455/557; 455/414.1; 455/414.2; 455/414.3; 455/436; 455/435.1; 709/248
(58) Field of Classification Search .... 455/414.1–414.3, 455/435.1, 436; 709/248
See application file for complete search history.

(56) References Cited

U.S. PATENT DOCUMENTS

| | | | | |
|---|---|---|---|---|
| 5,742,905 | A * | 4/1998 | Pepe et al. | 455/461 |
| 7,124,203 | B2 * | 10/2006 | Joshi et al. | 709/248 |
| 7,551,922 | B2 * | 6/2009 | Roskowski et al. | 455/423 |
| 2002/0198004 | A1 * | 12/2002 | Heie et al. | 455/456 |
| 2003/0187984 | A1 | 10/2003 | Banavar et al. | |
| 2004/0168121 | A1 | 8/2004 | Matz | |
| 2004/0235464 | A1 | 11/2004 | Korkalo et al. | |
| 2005/0188056 | A1 * | 8/2005 | Kangas et al. | 709/218 |

FOREIGN PATENT DOCUMENTS

EP 1494419 A1 1/2005

OTHER PUBLICATIONS

W3C Composite Capability, http://www.w3.org/TR/2004/REC-CCPP-struct-vocab-20040115/.
PC Magazine, http://www.pcmag.com/article2/0,1759,1619375,00. asp.
Yasuda, Kinuko et al., "Effects and Performance of Content Negotiation Based on CC/PP," Lecture Notes in Computer Science, vol. 1987/2001, Jan. 8, 2001, pp. 53-64.
Extended European Search Report issued Mar. 3, 2011, for European Application No. 07762258.7, 7 pages.
International Search Report mailed Oct. 14, 2008, for PCT/US07/69335, 11 pages.

* cited by examiner

*Primary Examiner* — Olumide T Ajibade Akonai
*Assistant Examiner* — Randy Peaches
(74) *Attorney, Agent, or Firm* — Withrow & Terranova, PLLC (57) ABSTRACT

The present invention provides a system and method for modifying a profile of a user device prior to sending the profile to a destination server, wherein the destination server customizes content provided to the user device based on the modified profile. In general, the profile of the user device may include information identifying capabilities of the user device, user preferences, and demographic information regarding a user of the user device. At either the user device or a mediating server interconnecting the user device and the destination server, the profile of the user device is modified based upon one or more rules to provide the modified profile. The modified profile is then provided to the destination server, which customizes content provided to the user device based on the modified profile.

25 Claims, 8 Drawing Sheets

SYSTEM AND METHOD FOR MODIFYING A DEVICE PROFILE

FIELD OF THE INVENTION

The present invention relates to customizing content provided to a user device based on a profile of the device, and more particularly relates to modifying the profile of a user device before providing the profile to a content provider.

BACKGROUND OF THE INVENTION

As a result of the proliferation of mobile devices having access to the Internet and the vastly varying capabilities of these mobile devices, the World Wide Web Consortium (W3C) has promulgated a Composite Capability/Preference Profile (CC/PP) standard enabling customization of web content based on the capabilities and user preferences of a recipient device. More specifically, according to the CC/PP standard, a profile identifying the capabilities and user preferences of a device is created. The profile may be provided to web content providers and used to customize the web content provided to the device. For example, the profile of a device may indicate that the display of the device is 320×200 pixels. As a result, the web content provider may reduce the size of, for example, an image such that the image fits the display of the device.

However, providing device profiles to the web content provider raises security and privacy issues. Many users may desire not to share at least some of the information contained in the device profile with web content providers. Thus, there is a need for a system and method for addressing these security and privacy concerns.

In addition, both the users of the devices and operators of locations in which the devices are present may desire to control the use, or non-use, of certain device capabilities. For example, a user may prefer that no audio content be provided to his or her device after 11:00 p.m. Likewise, the operator of a library may desire to prevent audio content from being played by devices present in the library. Thus, there remains a need for a system and method for controlling the use of the particular device capabilities.

SUMMARY OF THE INVENTION

The present invention provides a system and method for modifying a profile of a user device prior to sending the profile to a destination server, wherein the destination server customizes content provided to the user device based on the modified profile. In general, the profile of the user device may include information identifying capabilities of the user device, user preferences, and demographic information regarding a user of the user device. When sending the profile to the destination server, the profile of the user device is modified by either the user device or a mediating server interconnecting the user device and the destination server based upon one or more rules. Based on the rules, capabilities, such as audio capabilities, identified in the profile may be modified by either removing capabilities from or adding capabilities to the profile in order to control the use of the capabilities. In addition or alternatively, the rules may direct the user device or the mediating server to remove information such as all or a portion of the user preferences and the demographic information from the profile when providing the profile to an identified destination server. The modified profile is provided to the destination server, which customizes content provided to the user device based on the modified profile.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
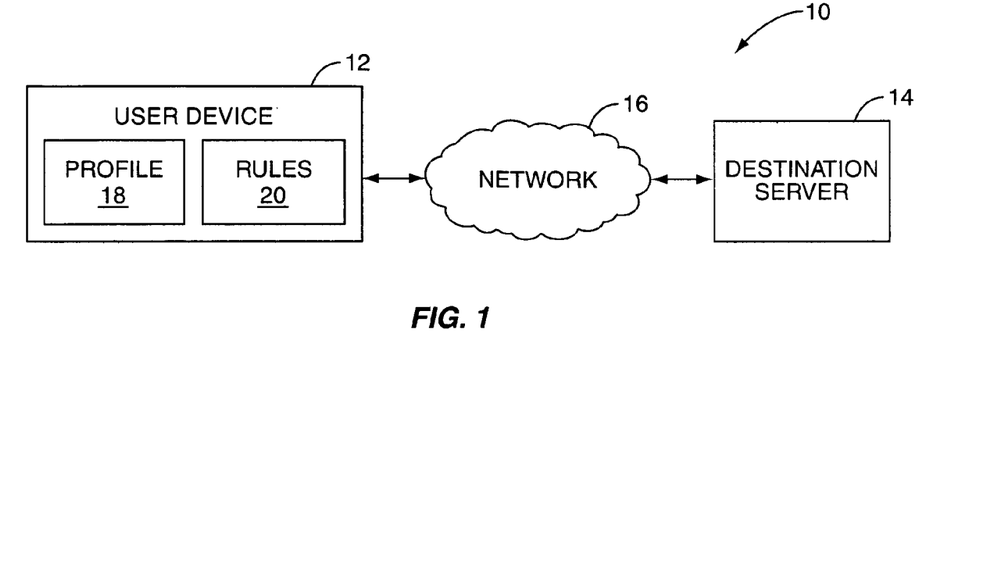
FIG. 1 illustrates a system for modifying a profile of a user device prior to providing the profile to a destination server according to one embodiment of the present invention.

FIG. 1 illustrates a system 10 operating according to one embodiment of the present invention. In general, the system 10 includes a user device 12 and a destination server 14 communicatively coupled by a network 16, which may be a distributed, public network such as the Internet. In operation, the user device 12 modifies a profile 18 of the user device 12 using rules 20 and provides the modified profile to the destination server 14. At the same time or at some time thereafter, the user device 12 requests content from the destination server 14. The content may be, for example, a web page, multimedia content, or the like. Based on the modified profile, the destination server 14 generates a customized response and provides the customized response to the user device 12.

The user device 12 may be a personal computer; a mobile device such as, but not limited to, a mobile telephone or a Personal Digital Assistant (PDA); or the like. The user device 12 stores the profile 18 and the rules 20. The profile 18 may be automatically generated by the user device 12 and includes metadata, or information, describing the user device 12. More specifically, the profile 18 may include an Internet Protocol (IP) address of the user device 12 or the like, a device identifier (ID) of the user device 12, a user agent of the user device 12, information identifying the capabilities of the user device 12, user preferences, and demographic information.

The user agent is an indicator of the program being used to access content such as, for example, Microsoft Internet Explorer. By knowing the user agent, certain capabilities may be inferred. For example, if the user agent is Microsoft Internet Explorer, it can be inferred that the user agent is a web browser that can display images, interpret HTML, and the like. The device ID could be either a globally unique ID or a make/model type ID. The device capabilities include hardware specifications for the user device 12. For example, the device capabilities may indicate that the user device 12 has a color display having a 320×200 resolution, can produce stereo sound, has 1 MB of storage space, and has audio, video, and image capture capabilities. Further, the device capabilities may include capabilities of the audio, video, and image capture function such as maximum resolution, possible file formats, bitrate, and the like.

The user preferences may include various user preferences. For example, if the user device 12 is a mobile telephone, or has mobile telephone capabilities, the user may prefer that the user device 12 is set to vibrate instead of ring or answer-on-open rather than push-talk-to-answer. The user preferences may also include preferences for font face and size, color scheme, background image, or the like. In addition, the user preferences may include other preferences unrelated to the user device 12, such as, for example, the user's favorite pizza topping. It should be noted that the user preferences could store virtually any type of user preferences which may or may not be related to the user device 12.

The demographic information may include, but is not limited to, a name, mailing address, age, gender, marital status, and the like for a user of the user device 12. In an exemplary embodiment, the profile 18 may be a Composite Capability/Preference Profile (CC/PP) as disclosed in the CC/PP recommendation of the World Wide Web Consortium (W3C) entitled "Composite Capabilities/Preference Profiles (CC/PP): Structure and Vocabularies 1.0," which was published Jan. 15, 2004 and can be found at http://www.w3.org/TR/2004/REC-CCPP-struct-vocab-20040115/.

In this embodiment, the rules 20 are rules defined by the user of the user device 12 that are used to modify the profile 18 of the user device 12 to control content provided to the user device 12. Based on the rules 20, the user device 12 operates to modify, or filter, the profile 18. The rules 20 are formed using one or more criterion such as, but not limited to, location, time, destination, resource availability, or the like, or any combination thereof. Regarding time, the rules 20 may include rules defined by the user of the user device 12 based on, at least in part, the current time of day, day of the week, date, or any combination thereof. For example, the rules 20 may include a rule that removes audio capabilities from the profile or modifies the profile to indicate that the user device 12 has no audio capabilities after 11:00 p.m. such that no audio content is provided to the user device 12 after 11:00 p.m. As another example, the rules 20 may include a rule that adds audio capabilities to the profile or modifies the profile to indicate that the user device 12 has audio capabilities when another user device is associated with the user device 12 and can be used to play or consume audio content.

Regarding location, the rules 20 may include rules defined by the user of the user device 12 based on, at least in part, a current location of the device. As an example, a user may define a location named "Library" and create a rule that removes audio capabilities from the profile or modifies the profile to indicate that the user device 12 has no audio capabilities when the user device 12 is at the location named "Library."

The location of the user device 12 may be determined based on Global Positioning System (GPS) coordinates, selected by the user of the user device 12, or provided to the user device 12 from a device associated with the location. More specifically, in one embodiment, the user device 12 may be equipped with a GPS receiver or the like. The user may define a location, such as the location "Library," by entering the GPS coordinates of the location; by entering an address of the location, wherein the GPS coordinates may be determined or obtained for the location based on the address; or by using the coordinates from the GPS receiver while the user device 12 is present at the location. Thereafter, the user device 12 may determine whether it is present at one of the defined locations based on coordinates from the GPS receiver.

If the user device 12 is not equipped with a GPS receiver or if otherwise desired, the user of the user device 12 may define locations by providing names for the locations and associating rules with the locations. Thereafter, when the user device 12 is present at one of the defined locations, the user may interact with the user device 12 to select the current location of the user device 12. For example, the user may define a location "Library." When the user is thereafter present at the location "Library," the user may interact with the user device 12 to select the location "Library" as the current location of the user device 12.

In yet another embodiment, the location of the user device 12 may be provided by a device associated with the location. For example, one or more local wireless communication devices may be present at the location and operate to provide the GPS coordinates of the location, the address of the location, a description of the location, or the like, or any combination thereof. The above examples of how the location of the user device 12 may be determined or obtained are not intended to be an exhaustive list and are not intended to limit the scope of the present invention.

Regarding destination, the rules 20 may include rules defined by the user of the user device 12 based on, at least in part, destination. More specifically, the user may identify destination servers, such as the destination server 14, using information such as, but not limited to, an IP address of the destination server 14, a Uniform Resource Locator (URL) for the destination server 14, or the like. Once identified, the user may define one or more rules for the destination servers. For example, the destination server 14 may host a web page with unwanted background music. As such, the user may define a rule for the destination server 14 that removes audio capabilities from the profile or modifies the profile to indicate that the user device 12 has no audio capabilities when providing the profile to the destination server 14. As a result, when the user device 12 requests the web page from the destination server 14, the destination server 14 may customize a response for the user device 12 based on the modified profile such that the background music, or audio content, is removed from the customized version of the web page provided to the user device 12.

The rules 20 may also include rules for removing information from the profile 18 of the user device 12 such as the demographic information, user preferences, or any portion thereof when providing the profile 18 to destination servers, such as the destination server 14. These rules may be associated with all destination servers or particular destination servers. Thus, for the destination server 14, the rules 20 may include a rule instructing the user device 12 to remove demographic information, user preferences, or both demographic information and user preferences from the profile 18 of the user device 12 when providing the profile 18 to the destination server 14. This may be particularly beneficial when the user of the user device 12 does not want to share private information with the destination server 14.

Regarding resource availability, the rules 20 may include rules defined by the user of the user device 12 based on, at least in part, resource availability. These rules may alternatively or additionally be automatically created by the user device 12. For example, the rules 20 may include a rule that removes file storage capabilities from the profile 18 or modifies the profile 18 to indicate that the user device 12 does not have file storage capabilities if the available file storage space is less than a threshold level or if the file storage space is essentially full.

The rules 20 may also include rules defined based on a combination of criteria. For example, the rules 20 may include a rule based on location and time. More specifically, a rule may be defined for a location "Movie Theater," where audio capabilities are available prior to a movie start time and removed from the profile 18 once the movie begins. As a result, when the user device 12 requests content from a destination server, such as the destination server 14, before the movie begins, audio content may be provided to the user device 12. However, once the movie begins, audio content may no longer be provided to the user device 12.

Figure 2:
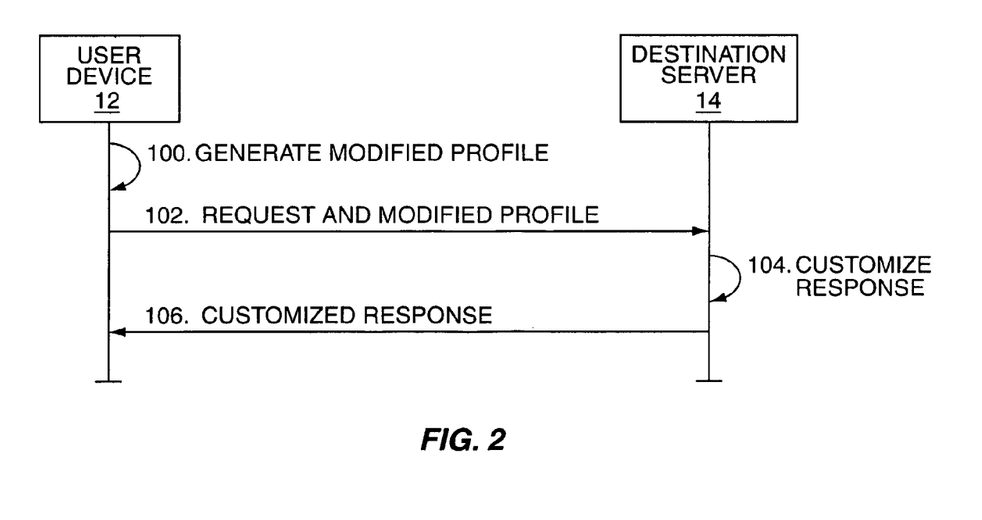
FIG. 2 illustrates the operation of the system of FIG. 1.

FIG. 2 illustrates the operation of the system 10 of FIG. 1. First, the user device 12 operates to generate a modified profile (step 100). The modified profile is generated by modifying, or filtering, the profile 18 of the user device 12 using the rules 20. A request and the modified profile are then provided to the destination server 14 via the network 16 (step 102). While the request and the modified profile are illustrated as being provided to the destination server 14 in a single step, the present invention is not limited thereto. The manner in which the modified profile is provided to the destination server 14 may vary depending on the particular communication protocol used for communication between the user device 12 and the destination server 14. For example, the modified profile may be provided to the destination server 14 with each request sent to the destination server 14 or provided to the destination server 14 with only a first request sent to the destination server 14. The modified profile may be part of the request or a separate message provided prior to or after the request.

Upon receiving the request and the modified profile, the destination server 14 operates to customize the response to be provided to the user device 12 (step 104). The response may be customized based on the capabilities of the device, user preferences, demographic information, or any combination thereof identified in the modified profile. For example, the modified profile may indicate that the user device 12 does not have audio capabilities. As such, the destination server 14 may customize the response by removing audio content. Once the customized response is generated, the destination server 14 provides the customized response to the user device 12 (step 106).

Figure 3:
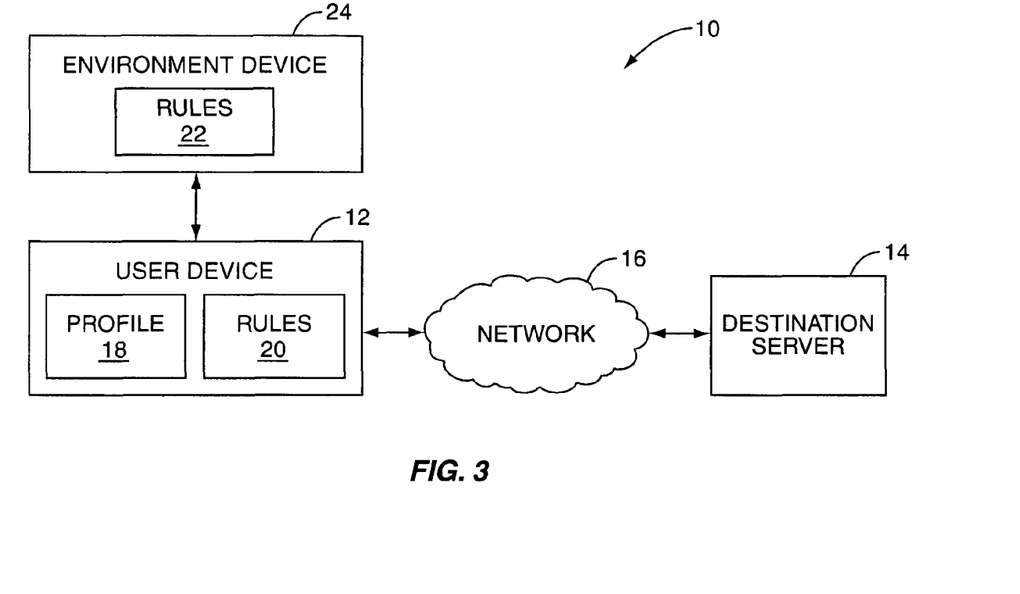
FIG. 3 illustrates a system for modifying a profile of a user device prior to providing the profile to a destination server according to a second embodiment of the present invention.

FIG. 3 illustrates the system 10 according to a second embodiment of the present invention wherein the user device 12 obtains environment, or location, defined rules 22 from an environment device 24. The rules 22 may be used in addition to or as an alternative to the rules 20 defined by the user of the user device 12. As such, the rules 20 are optional in this embodiment. The rules 22 are associated with the location and may be defined based on criteria such as, but not limited to, time, destination, resource availability, or the like, or any combination thereof.

In order to obtain the rules 22 from the environment device 24, the user device 12 may be equipped with a local wireless interface operating according to a standard such as, but not limited to, the Bluetooth standard or one of the suite of IEEE 802.11 standards. When the user device 12 is at a particular location at which the environment device 24 is located, the user device 12 may receive the rules 22 from the environment device 24 by local wireless communication. The environment device 24 may be any device present at or associated with the location having a local wireless communication interface for communicating with the user device 12.

Figure 4:
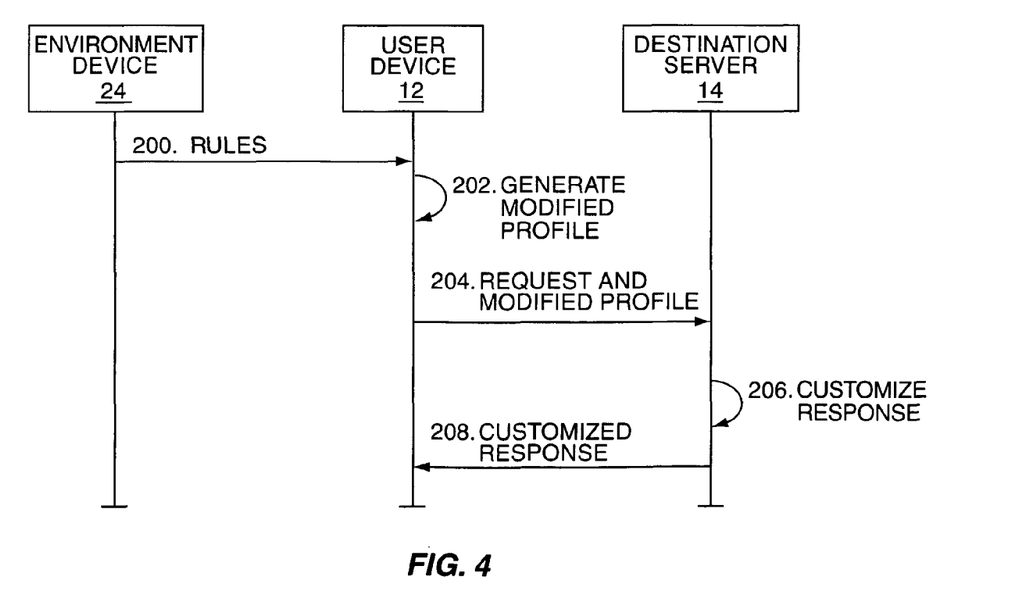
FIG. 4 illustrates the operation of the system of FIG. 3.

FIG. 4 illustrates the operation of the system 10 of FIG. 3. First, the rules 22 are provided from the environment device 24 to the user device 12 (step 200). The rules 22 are location-based rules and are preferably defined by an operator associated with the location. For example, the operator of a library may define the rules 22 such that profiles of user devices, such as the user device 12, present at the library are modified to remove, for example, audio capabilities. As such, the operator of the library may prevent undesirable noise in the library. In a similar fashion, for a movie theater, the rules 22 may be provided such that audio capabilities are permitted before and after but not during a movie.

The user device 12 then generates a modified profile based on the profile 18 of the user device 12, the rules 22 from the environment device 24, and optionally the rules 20 defined by the user of the user device 12 (step 202). The user device 12 then provides a request and the modified profile to the destination server 14 via the network 16 (step 204). As discussed above, while the request and the modified profile are illustrated as being provided to the destination server 14 in a single step, the present invention is not limited thereto. The manner in which the modified profile and the request are provided to the destination server 14 may vary depending on the communication protocol used for communication between the user device 12 and the destination server 14.

Upon receiving the request and the modified profile, the destination server 14 operates to customize the response to be provided to the user device 12 (step 206). The response may be customized based on the capabilities of the device, user preferences, demographic information, or any combination thereof identified in the modified profile. Once the customized response is generated, the destination server 14 provides the customized response to the user device 12 (step 208).

Figure 5:
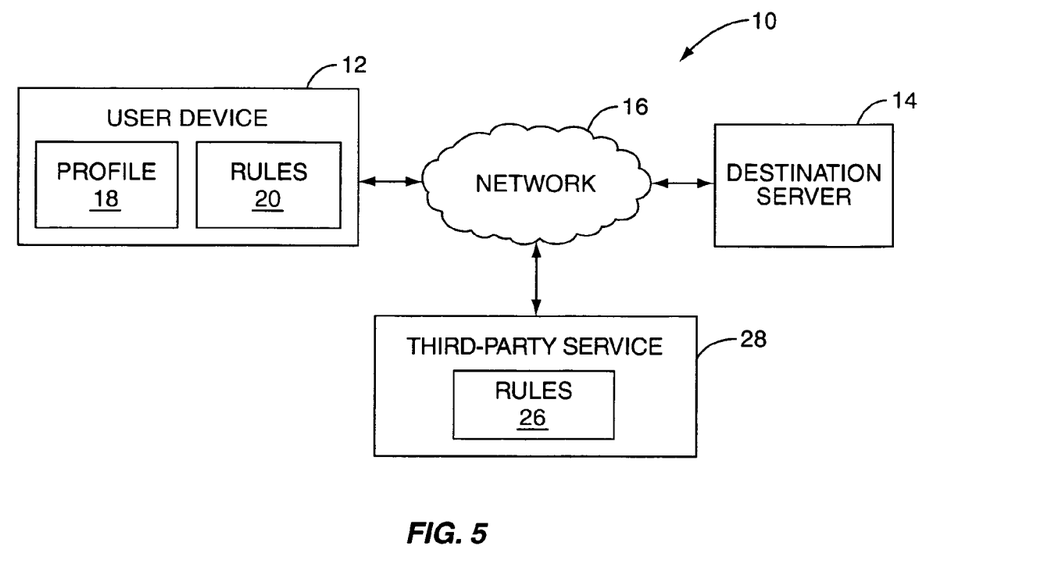
FIG. 5 illustrates a system for modifying a profile of a user device prior to providing the profile to a destination server according to a third embodiment of the present invention.

FIG. 5 illustrates the system 10 according to a third embodiment of the present invention wherein the user device 12 obtains rules 26 from a third-party service 28. The rules 26 may be used in addition to or as an alternative to the rules 20 defined by the user of the user device 12 and stored on the user device 12. Note that the rules 20 are optional in this embodiment. The rules 26 may be defined by the user of the user device 12 or defined by an operator of a location at which the user device is present. As discussed above, the rules 26 may be defined based on location, time, destination, resource availability, or the like, or any combination thereof. The third-party service 28 may be, for example, a service provided by a cellular service provider, an Internet service provider, or the like. Alternatively, the third-party service 28 may be a service associated with a current location of the user device 12.

In one embodiment, the rules 26 are defined by an operator of the location, and the user device 12 obtains information identifying the location of the user device 12 and requests the rules 26 associated with the location from the third-party service 28. As discussed above, the location of the user device 12 may be obtained, for example, from an associated GPS receiver, provided by the user of the user device 12, or provided by a device associated with the location. A URL of the third-party service 28 may be known to the user device 12, provided by the user of the user device 12, or provided from a device associated with the location.

In another embodiment, the rules 26 are defined by the user of the user device 12. More specifically, the user of the user device 12 may be identified using, for example, a log-on process. Thereafter, the rules 26 defined by the user may be requested and obtained from the third-party service 28. A URL of the third-party service 28 may be known to the user device 12 or provided by the user of the user device 12.

Figure 6:
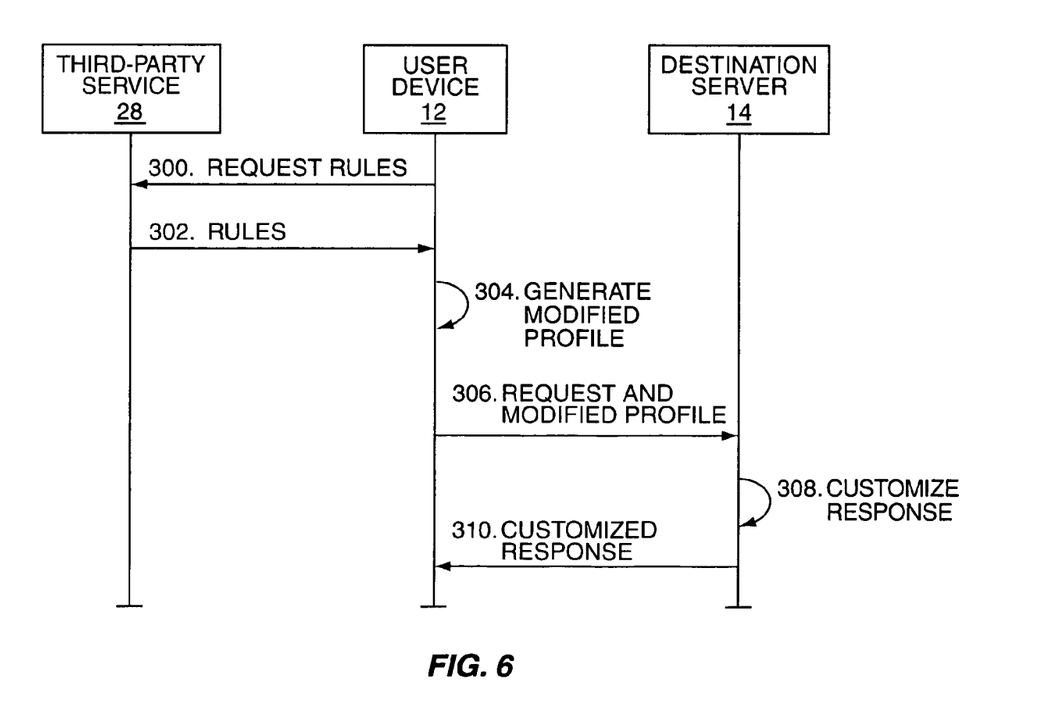
FIG. 6 illustrates the operation of the system of FIG. 5.

FIG. 6 illustrates the operation of the system 10 of FIG. 5. In general, the user device 12 first requests the rules 26 from the third-party service 28 (step 300). In response, the third-party service 28 provides the rules 26 to the user device 12 (step 302). The user device 12 then generates a modified profile based on the profile 18 of the user device 12, the rules 26 from the third-party service 28, and optionally the rules 20 defined by the user of the user device 12 (step 304). The user device 12 then provides a request and the modified profile to the destination server 14 via the network 16 (step 306). As discussed above, while the request and the modified profile are illustrated as being provided to the destination server 14 in a single step, the present invention is not limited thereto. The manner in which the modified profile and the request are provided to the destination server 14 may vary depending on the communication protocol used for communication between the user device 12 and the destination server 14.

Upon receiving the request and the modified profile, the destination server 14 operates to customize the response to be provided to the user device 12 (step 308). The response may be customized based on the capabilities of the device, user preferences, demographic information, or any combination thereof identified in the modified profile. Once the customized response is generated, the destination server 14 provides the customized response to the user device 12 (step 310).

Figure 7:
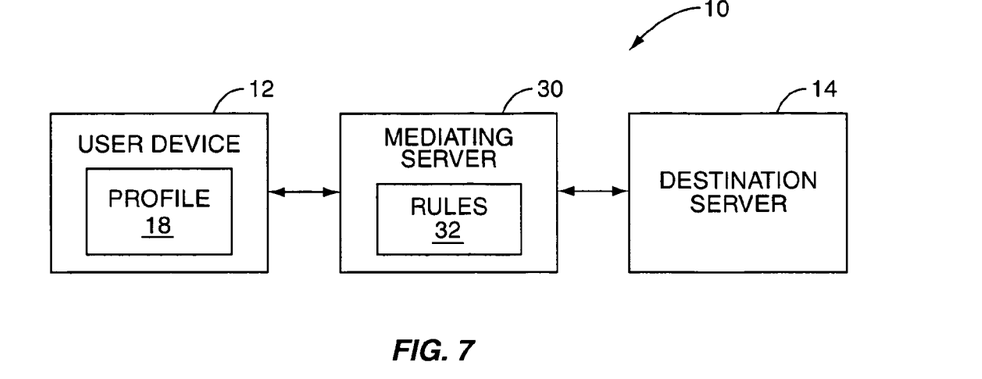
FIG. 7 illustrates a system for modifying a profile of a user device prior to providing the profile to a destination server according to a fourth embodiment of the present invention.

FIGS. 7-10 illustrate embodiments of the system 10 of the present invention wherein the profile 18 of the user device 12 is modified by a mediating server 30 rather than the user device 12. More specifically, FIG. 7 illustrates a fourth embodiment of the system 10 wherein the system 10 includes the user device 12, the destination server 14, and the mediating server 30. While only the mediating server 30 is illustrated as being between the user device 12 and the destination server 14, the present invention is not limited thereto. As will be apparent to one of ordinary skill in the art upon reading this disclosure, the mediating server 30 may be part of a distributed network, such as the network 16 (FIG. 1), wherein multiple network nodes may interconnect the mediating server 30 to the user device 12 and the destination server 14. The mediating server 30 may be any network node between the user device 12 and the destination server 14. As an example, the mediating server 30 may be a server associated with a current location of the user device 12 interconnecting the user device 12 to the destination server 14.

In this embodiment, rules 32 are stored by the mediating server 30 and may include rules defined by the user of the user device 12, rules defined by an operator of a current location of the user device 12, or a combination thereof. The rules 32 may be provided to the mediating server 30 from the user device 12 or from an operator, or operator service, associated with the current location of the user device 12. As discussed above, the rules 32 may be defined based on criteria such as, but not limited to, location, time, destination, resource availability, and the like, or any combination thereof.

Figure 8:
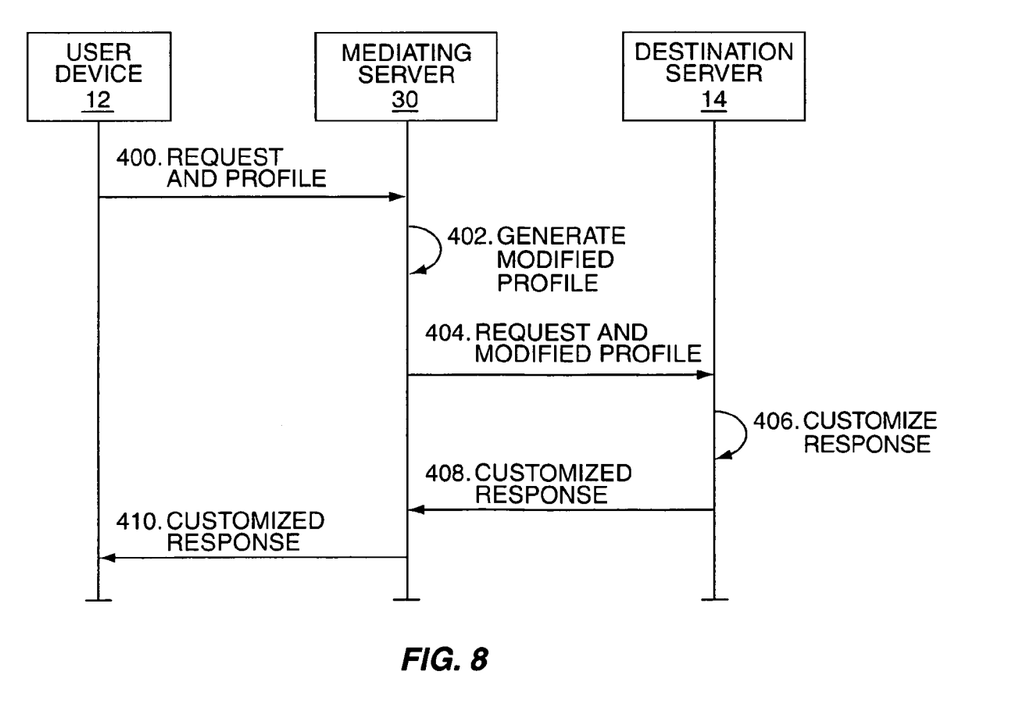
FIG. 8 illustrates the operation of the system of FIG. 7.

FIG. 8 illustrates the operation of the system 10 of FIG. 7 according to a fourth embodiment of the present invention. First, a request and the profile 18 of the user device 12 are provided to the mediating server 30 (step 400). While the request and the profile are illustrated as being provided to the mediating server 30 in a single step, the present invention is not limited thereto. The manner in which the profile and the request are provided to the mediating server 30 may vary depending on the communication protocol used for communication between the user device 12 and the mediating server 30.

Using the rules 32, the mediating server 30 processes the profile 18 of the user device 12 to generate a modified profile (step 402). The request and modified profile are then provided to the destination server 14 (step 404). Depending on the communication protocol used, the modified profile may be provided to the destination server 14 with each request from the user device 12 or with only the first request from the user device 12. Upon receiving the request and modified profile, the destination server 14 operates to customize the response to be provided to the user device 12 (step 406). The response may be customized based on the capabilities of the device, user preferences, demographic information, or any combination thereof identified in the modified profile. Once the customized response is generated, the destination server 14 provides the customized response to the mediating server 30 (step 408), which in turn provides the customized response to the user device 12 (step 410).

Figure 9:
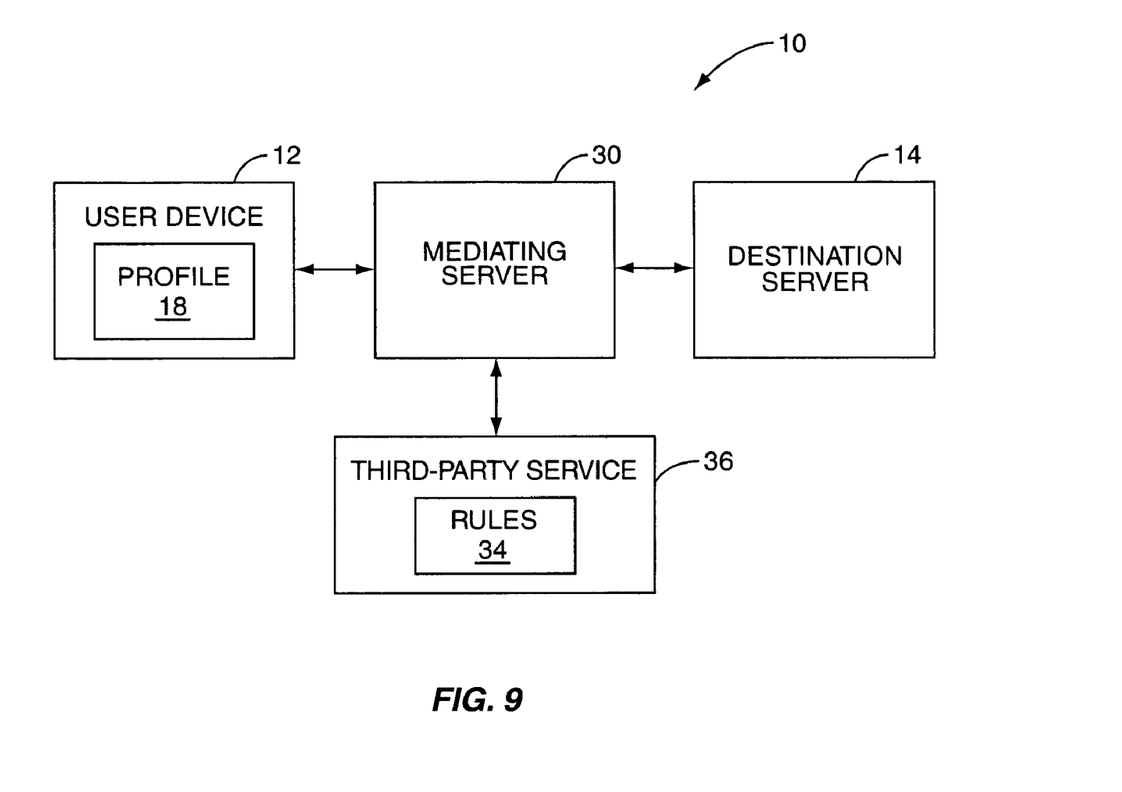
FIG. 9 illustrates a system for modifying a profile of a user device prior to providing the profile to a destination server according to a fifth embodiment of the present invention.

FIG. 9 illustrates the system 10 according to a fifth embodiment of the present invention. In this embodiment, rules 34 used by the mediating server 30 to modify the profile 18 of the user device 12 are obtained from a third-party service 36 rather than stored by the mediating server 30. The URL of the third-party service 36 is either known to the mediating server 30 or identified in either a request from the user device 12 or the profile 18 of the user device 12. The rules 34 stored by the third-party service 36 may be defined by the user of the user device 12 or an operator of a current location of the user device 12.

Figure 10:
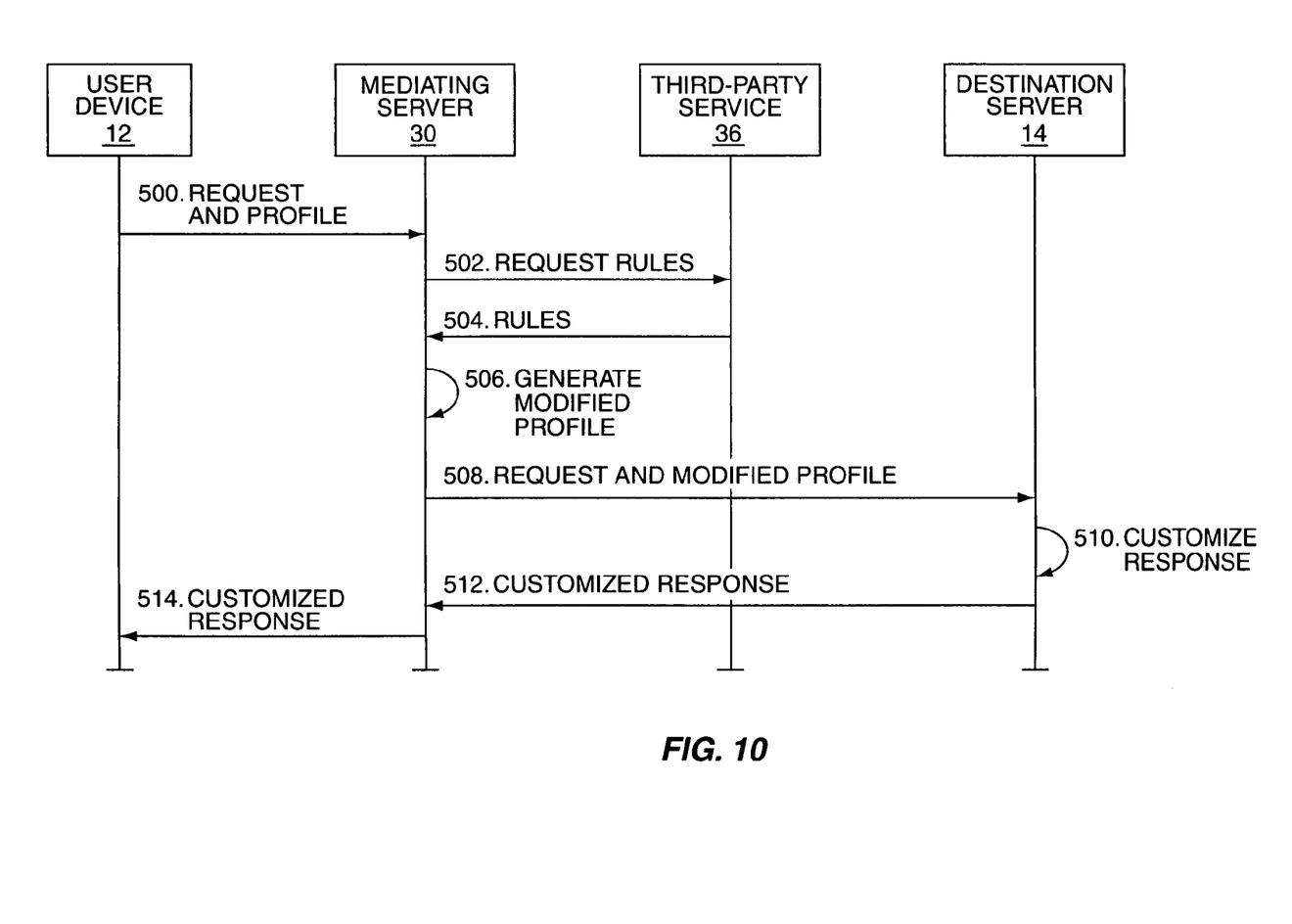
FIG. 10 illustrates the operation of the system of FIG. 9.

FIG. 10 illustrates the operation of the system 10 of FIG. 9 according to a fifth embodiment of the present invention. First, a request and the profile 18 of the user device 12 are provided to the mediating server 30 (step 500). While the request and the profile are illustrated as being provided to the mediating server 30 in a single step, the present invention is not limited thereto. The mediating server 30 then requests the rules 34 from the third-party service 36 (step 502). As stated above, the third-party service 36 may be known to the mediating server 30 or identified in either the request or the profile 18 from the user device 12. In response to the request, the third-party service 36 provides the rules 34 to the mediating server 30 (step 504). Alternatively, if the third-party service 36 is known to the mediating server 30 prior to receiving the request, the mediating server 30 may pre-fetch and cache the rules 34 such that steps 502 and 504 are performed before receiving the request.

Using the rules 34, the mediating server 30 processes the profile 18 of the user device 12 to generate a modified profile (step 506). The request and the modified profile are then provided to the destination server 14 (step 508). Depending on the communication protocol used, the modified profile may be provided to the destination server 14 with each request from the user device 12 or with only the first request from the user device 12. Upon receiving the request and modified profile, the destination server 14 operates to customize the response to be provided to the user device 12 (step 510). The response may be customized based on the capabilities of the device, user preferences, demographic information, or any combination thereof identified in the modified profile. Once the customized response is generated, the destination server 14 provides the customized response to the mediating server 30 (step 512), which in turn provides the customized response to the user device 12 (step 514).

Figure 11:
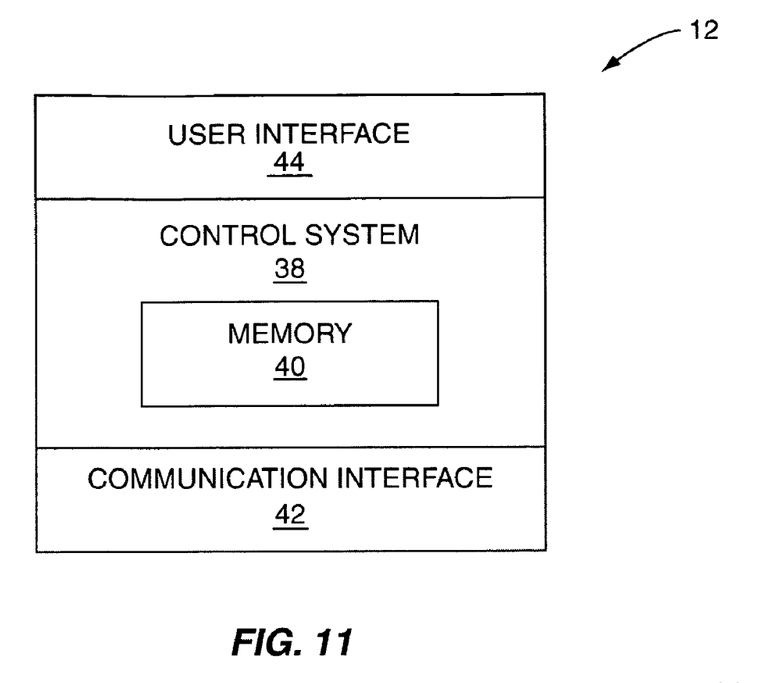
FIG. 11 is a block diagram of a user device according to one embodiment of the present invention.

FIG. 11 is block diagram of an exemplary embodiment of the user device 12 of FIGS. 1-10. In general, the user device 12 includes a control system 38 having associated memory 40. The memory 40 stores software instructing the user device 12 to operate according to the present invention. In addition, the memory 40 may store the profile 18 and optionally the rules 20 for modifying the profile 18. Alternatively, the profile 18 and optionally the rules 20 may be stored in an associated digital storage device such as, but not limited to, a hard-disc drive. The user device 12 also includes a communication interface 42. The communication interface 42 includes a network interface communicatively coupling the user device 12 to the network 16 and/or the mediating server 30. In addition, the communication interface 42 may include a secondary interface, which may be a local wireless interface, for communicating with the environment device 24 (FIG. 3) or other device associated with the current location of the user device 12. The user device 12 also includes a user interface 44, which may include components such as, but not limited to, a display, speakers, an input device such as a keyboard or keypad, and the like.

Figure 12:
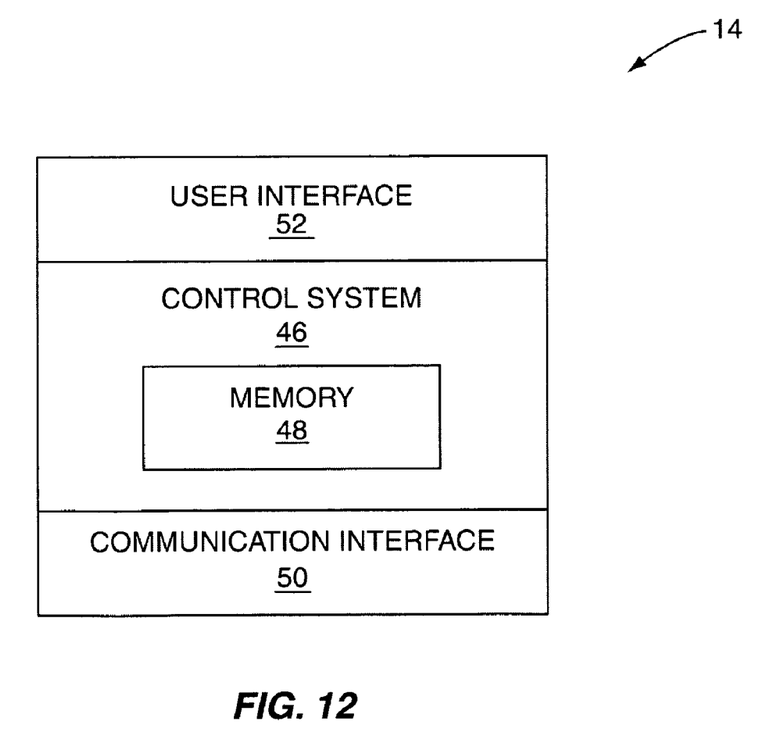
FIG. 12 is a block diagram of a destination server according to one embodiment of the present invention.

FIG. 12 is a block diagram of an exemplary embodiment of the destination server 14 of FIGS. 1-10. In general, the destination server 14 includes a control system 46 having associated memory 48. The memory 48 stores software instructing the destination server 14 to operate according to the present invention. The destination server 14 also includes a communication interface 50 communicatively coupling the destination server 14 to the network 16 or mediating server 30. The destination server 14 may also include a user interface 52.

Figure 13:
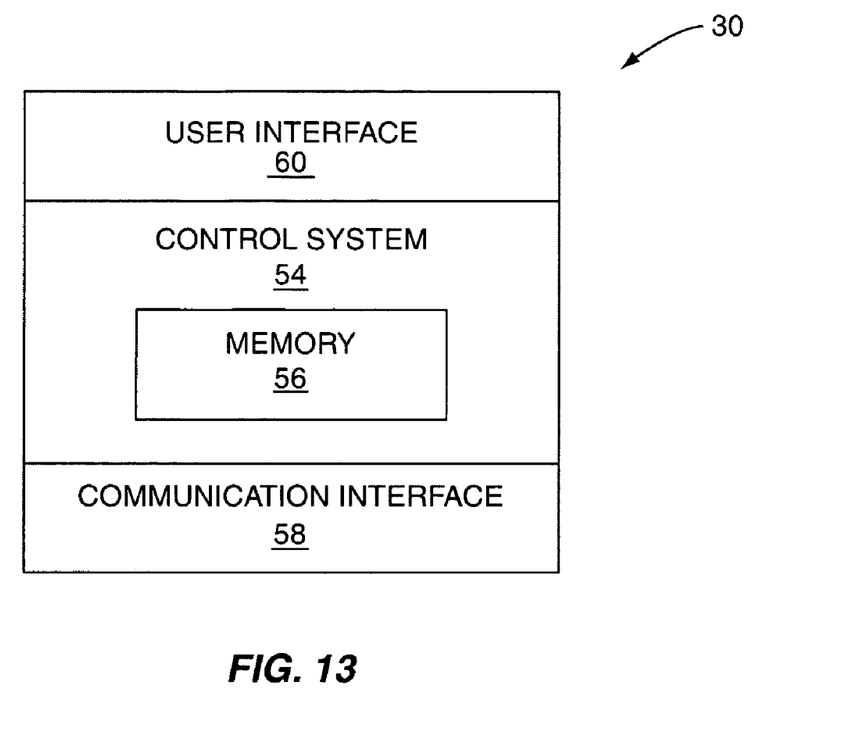
FIG. 13 is a block diagram of a mediating server according to one embodiment of the present invention.

FIG. 13 is a block diagram of an exemplary embodiment of the mediating server 30 of FIGS. 7-10. In general, the mediating server 30 includes a control system 54 having associated memory 56. The memory 56 stores software instructing the mediating server 30 to operate according to the present invention. For the embodiment of FIG. 7, the memory 56 may also store the rules 32. The mediating server 30 also includes a communication interface 58 communicatively coupling the mediating server 30 to both the user device 12 and the destination server 14. In addition, for the embodiment of FIG. 9, the communication interface 58 may further operate to communicatively couple the mediating server 30 to the third-party service 36. The mediating server 30 may also include a user interface 60.

Those skilled in the art will recognize improvements and modifications to the preferred embodiments of the present invention. All such improvements and modifications are considered within the scope of the concepts disclosed herein and the claims that follow.

What is claimed is:

1. A method comprising:
automatically modifying, at a mediating server interconnecting a user device and a destination server, a device capability identified in a device profile that identifies a plurality of device capabilities of the user device based on at least one rule in response to a request for content;
providing the modified device profile to the destination server; and
receiving a customized response from the destination server in response to the request for content from the user device, wherein the destination server provides the customized response based on the modified device profile.

2. The method of claim 1 wherein the at least one rule is based, at least in part, on time.

3. The method of claim 1 wherein the at least one rule defines a period of time and the device capability of the user device to be disabled for the period of time, and modifying, at the mediating server interconnecting the user device and the destination server, the device capability identified in the device profile comprises modifying, at the mediating server interconnecting the user device and the destination server the device profile to remove the device capability from the device profile during the period of time.

4. The method of claim 1 wherein the at least one rule defines a period of time and the device capability of the user device to be enabled for the period of time, and modifying, at the mediating server interconnecting the user device and the destination server, the device capability identified in the device profile comprises modifying, at the mediating server interconnecting the user device and the destination server the device profile to add the device capability to the device profile during the period of time.

5. The method of claim 1 wherein the at least one rule is based, at least in part, on location.

6. The method of claim 1 wherein the at least one rule defines a location and the device capability of the user device to be disabled when the user device is present at the location, and modifying, at the mediating server interconnecting the user device and the destination server, the device capability identified in the device profile comprises modifying, at the mediating server interconnecting the user device and the destination server, the device profile to remove the device capability from the device profile when the user device is present at the location.

7. The method of claim 1 wherein the at least one rule defines a location and the device capability of the user device to be enabled when the user device is present at the location, and modifying, at the mediating server interconnecting the user device and the destination server, the device capability identified in the device profile comprises modifying, at the mediating server interconnecting the user device and the destination server, the device profile to add the device capability to the device profile when the user device is present at the location.

8. The method of claim 1 wherein the at least one rule is based, at least in part, on time and location.

9. The method of claim 1 wherein the at least one rule defines a location, a period of time, and the device capability of the user device to be disabled for the period of time when the user device is present at the location, and modifying, at the mediating server interconnecting the user device and the destination server, the device capability identified in the device profile comprises modifying, at the mediating server interconnecting the user device and the destination server, the device profile to remove the device capability from the device profile for the period of time when the user device is present at the location.

10. The method of claim 1 wherein the at least one rule defines a location, a period of time, and the device capability of the user device to be enabled for the period of time when the user device is present at the location, and modifying, at the mediating server interconnecting the user device and the destination server, the device capability identified in the device profile comprises modifying, at the mediating server interconnecting the user device and the destination server, the device profile to add the device capability to the device profile for the period of time when the user device is present at the location.

11. The method of claim 1 wherein the at least one rule is based, at least in part, on the destination server.

12. The method of claim 1 wherein the at least one rule identifies the destination server and the device capability of the user device to be disabled when requesting content from the destination server, and modifying, at the mediating server interconnecting the user device and the destination server, the device capability identified in the device profile comprises modifying, at the mediating server interconnecting the user device and the destination server, the device profile to remove the device capability from the device profile when providing the device profile to the destination server.

13. The method of claim 1 further comprising modifying the device profile of the user device to remove information from the device profile based on at least one additional rule.

14. The method of claim 13 wherein the information comprises at least a portion of at least one of a group consisting of: user preferences and demographic information.

15. The method of claim 13 wherein the at least one rule is associated with the destination server such that the information is removed from the device profile when providing the device profile to the destination server.

16. The method of claim 1 wherein the at least one rule is based, at least in part, on resource availability.

17. The method of claim 1 wherein the at least one rule is defined by a user of the user device.

18. The method of claim 1 wherein the at least one rule is defined by an operator associated with a current location of the user device.

19. The method of claim 1 further comprising storing the at least one rule locally.

20. The method of claim 1 further comprising obtaining the at least one rule from an environment device associated with a current location of the user device.

21. The method of claim 1 further comprising obtaining the at least one rule from a third-party service.

22. The method of claim 1 wherein the device profile is a Composite Capability/Preference Profile (CC/PP).

23. A method comprising:
automatically modifying, at a mediating server interconnecting a user device and a destination server, a device profile of the user device to remove information from the device profile based on at least one rule in response to a request for content, wherein the device profile identifies a plurality of device capabilities;
providing the modified device profile to the destination server; and
receiving a customized response from the destination server in response to the request for content from the user device, wherein the destination server provides the customized response based on the modified device profile.

24. A mediating server comprising:
a communication interface communicatively coupling the mediating server to a user device and a destination server; and
a control system associated with the communication interface and adapted to:
receive a device profile that identifies a plurality of device capabilities of the user device from the user device;
modify a device capability identified in the device profile of the user device based on at least one rule;
provide the modified device profile to the destination server;
request content from the destination server in response to a request for the content from the user device;
receive a customized response from the destination server in response to the request, wherein the destination server provides the customized response based on the modified device profile; and
provide the customized response to the user device.

25. A mediating server comprising:
a communication interface communicatively coupling the mediating server to a user device and a destination server; and
a control system associated with the communication interface and adapted to:
receive a device profile that identifies a plurality of device capabilities of the user device from the user device;
modify the device profile of the user device to remove information from the device profile based on at least one rule;
provide the modified device profile to the destination server;
request content from the destination server in response to a request for the content from the user device;
receive a customized response from the destination server in response to the request, wherein the destination server provides the customized response based on the modified device profile; and
provide the customized response to the user device.

* * * * *